(12) United States Patent
Yu

(10) Patent No.: US 10,540,581 B2
(45) Date of Patent: Jan. 21, 2020

(54) PRINTER

(71) Applicant: BROTHER KOGYO KABUSHIKI KAISHA, Nagoya-shi, Aichi-ken (JP)

(72) Inventor: Zhipeng Yu, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 16/102,101

(22) Filed: Aug. 13, 2018

(65) Prior Publication Data

US 2019/0073573 A1    Mar. 7, 2019

Related U.S. Application Data

(63) Continuation of application No. 13/846,964, filed on Mar. 19, 2013, now Pat. No. 10,049,313.

(30) Foreign Application Priority Data

Mar. 26, 2012  (JP) ................................. 2012-069806

(51) Int. Cl.
*G06K 15/00*      (2006.01)
*H04W 4/80*       (2018.01)
(Continued)

(52) U.S. Cl.
CPC ............ *G06K 15/4045* (2013.01); *B41J 3/36* (2013.01); *B41J 3/44* (2013.01); *G06F 3/1204* (2013.01);
(Continued)

(58) Field of Classification Search
USPC ....................................................... 358/1.15
See application file for complete search history.

(56) References Cited

U.S. PATENT DOCUMENTS 7,522,049 B2    4/2009  Aljadeff et al.
7,782,213 B2 *  8/2010  Ohashi ..................... B41J 2/325
                                                        235/375
(Continued)

FOREIGN PATENT DOCUMENTS

JP    2006-163791 A    6/2006
JP    2006-311077 A    11/2006
(Continued)

OTHER PUBLICATIONS

United States Notice of Allowance dated Aug. 14, 2014 in related U.S. Appl. No. 14/217,647.
(Continued)

*Primary Examiner* — Tammy Paige Goddard
*Assistant Examiner* — Darryl V Dottin
(74) *Attorney, Agent, or Firm* — Scully, Scott, Murphy & Presser, P.C.

(57) ABSTRACT

The disclosure discloses a printer comprising a feeder, a printing head, a printer RFID tag comprising a tag antenna and an IC circuit part, a communication antenna, and a control device. The control device being configured to execute an information acquisition process for acquiring access point information via a wired communication connecting part from the printer RFID tag, the access point information being acquired by the printer RFID tag by tag communication, a transmission and reception attempting process for attempting information transmission and reception with an access point, by means of the mutually recognized wireless communication, a data acquisition process for acquiring desired print data acquired by the mutually recognized wireless communication when information transmission and reception by the transmission and reception attempting process succeed, and a printing control process (Continued)

for controlling the feeder and the printing head so that printing is performed on a print-receiving medium.

6 Claims, 13 Drawing Sheets

(51) Int. Cl.
    *B41J 3/36*     (2006.01)
    *B41J 3/44*     (2006.01)
    *G06F 3/12*     (2006.01)
    *H04W 12/06*    (2009.01)

(52) U.S. Cl.
    CPC .......... *G06F 3/1236* (2013.01); *G06F 3/1292* (2013.01); *H04W 4/80* (2018.02); *H04W 12/06* (2013.01)

(56) References Cited

U.S. PATENT DOCUMENTS

| | | | |
|---|---|---|---|
| 8,897,212 B2* | 11/2014 | Lo ..................... | H04W 76/11 370/328 |
| 2005/0207381 A1 | 9/2005 | Aljadeff et al. | |
| 2006/0120313 A1 | 6/2006 | Moritomo et al. | |
| 2006/0246946 A1 | 11/2006 | Moritomo et al. | |
| 2007/0040893 A1 | 2/2007 | Kawakami et al. | |
| 2007/0121541 A1 | 5/2007 | Matsuo | |
| 2007/0146474 A1 | 6/2007 | Kameda et al. | |
| 2008/0198766 A1 | 8/2008 | Ogawa | |
| 2008/0299909 A1 | 12/2008 | Sakai | |
| 2009/0034731 A1 | 2/2009 | Oshima | |
| 2009/0039147 A1 | 2/2009 | Yamamoto et al. | |
| 2009/0065572 A1* | 3/2009 | Jain ................. | G06K 19/07739 235/379 |
| 2009/0253374 A1 | 10/2009 | Matsuo et al. | |
| 2009/0256672 A1* | 10/2009 | Yamamoto ............ | G06Q 10/08 340/5.2 |
| 2010/0181383 A1 | 7/2010 | Ohashi et al. | |
| 2010/0226304 A1 | 9/2010 | Shoji | |
| 2011/0001769 A1 | 1/2011 | Nagai | |
| 2011/0063663 A1 | 3/2011 | Kim et al. | |
| 2012/0258658 A1 | 10/2012 | Matsuo | |
| 2013/0014232 A1 | 1/2013 | Louboutin et al. | |
| 2013/0141747 A1 | 6/2013 | Oba et al. | |
| 2013/0250357 A1 | 9/2013 | Yu | |
| 2014/0293331 A1 | 10/2014 | Asai | |
| 2014/0293333 A1 | 10/2014 | Asai | |

FOREIGN PATENT DOCUMENTS

| | | |
|---|---|---|
| JP | 2006-352577 A | 12/2006 |
| JP | 2007-088726 A | 4/2007 |
| JP | 2007-150984 A | 6/2007 |
| JP | 2007-151194 A | 6/2007 |
| JP | 2008-271150 A | 11/2008 |
| JP | 2008-301214 A | 12/2008 |
| WO | 2013/006315 A1 | 1/2013 |

OTHER PUBLICATIONS

United States Office Action dated Oct. 9, 2014 in related U.S. Appl. No. 14/217,895.
Japanese Office Action dated Oct. 13, 2015 in related application JP 2012-069806.
United States Office Action dated Sep. 11, 2015 in related U.S. Appl. No. 14/217,895.
United States Office Action dated Sep. 14, 2015 in related U.S. Appl. No. 14/797,745.
Japanese Office Action dated Jun. 30, 2015 in related application JP 2013-070378.
Japanese Office Action dated Jul. 14, 2015 in related application JP 2013-070374.
United States Office Action dated Jan. 2, 2014 in related U.S. Appl. No. 13/846,964.
United States Office Action dated Jul. 10, 2014 in related U.S. Appl. No. 13/846,964.
United States Office Action dated Jan. 28, 2015 in related U.S. Appl. No. 13/846,964.
United States Office Action dated Sep. 2, 2015 in related U.S. Appl. No. 13/846,964.
United States Office Action dated Jul. 14, 2016 in related U.S. Appl. No. 13/846,964.
United States Office Action dated May 8, 2017 in related U.S. Appl. No. 13/846,964.
United States Notice of Allowance dated Apr. 17, 2018 in related U.S. Appl. No. 13/846,964.
United States Notice of Allowance dated Jan. 13, 2016 in related U.S. Appl. No. 14/217,895.
United States Notice of Allowance dated Mar. 31, 2015 in related U.S. Appl. No. 14/217,895.
Hopkins, B., "Faster Data Transfer With Bluetooth and Contactless Communication", UrL:http://www.oracle.com/technetwork/articles/javame/nfc-bluetooth-142337.html, Jul. 2009, Oracle, pp. 1-6.

* cited by examiner

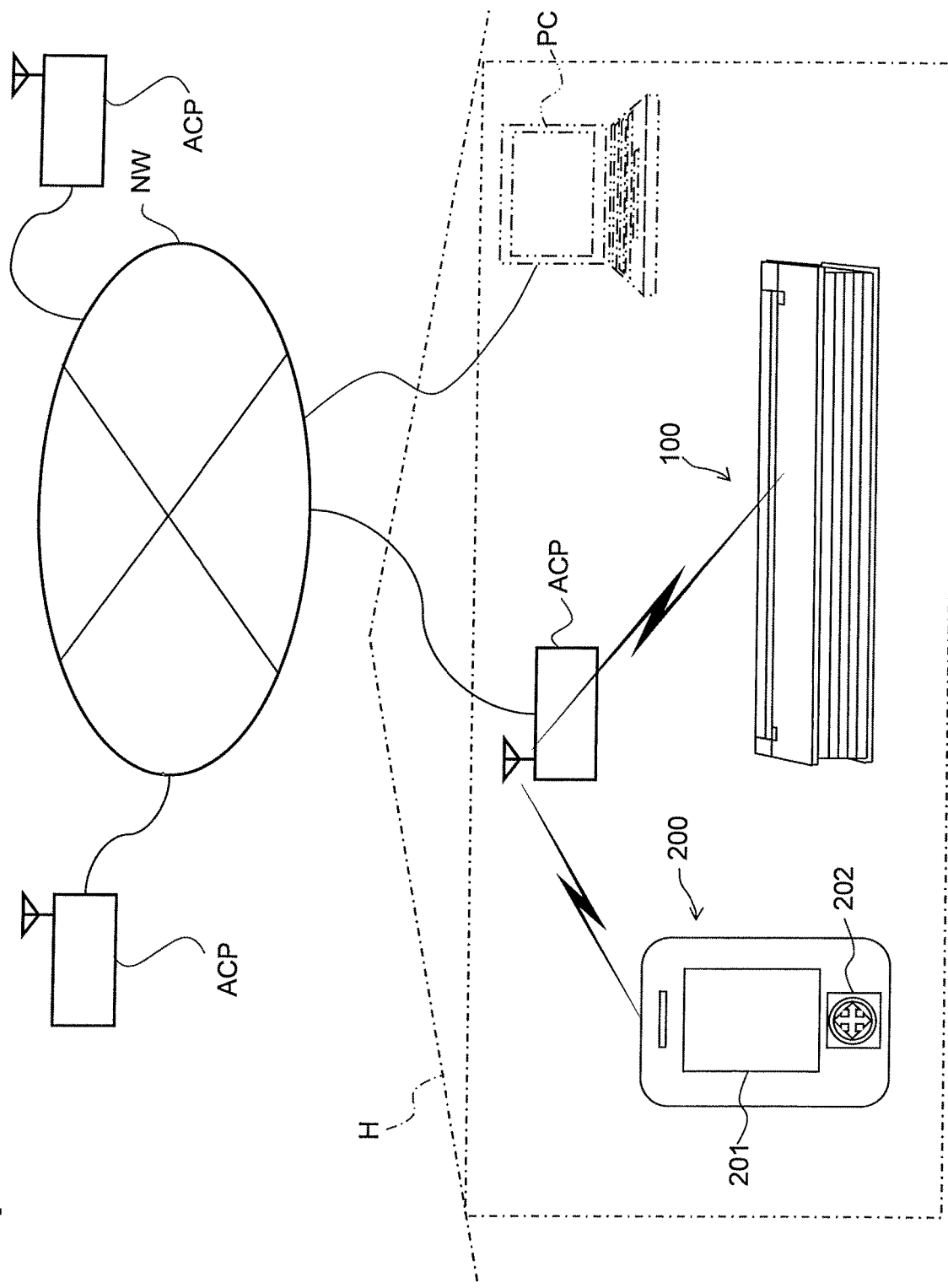
[FIG. 1]

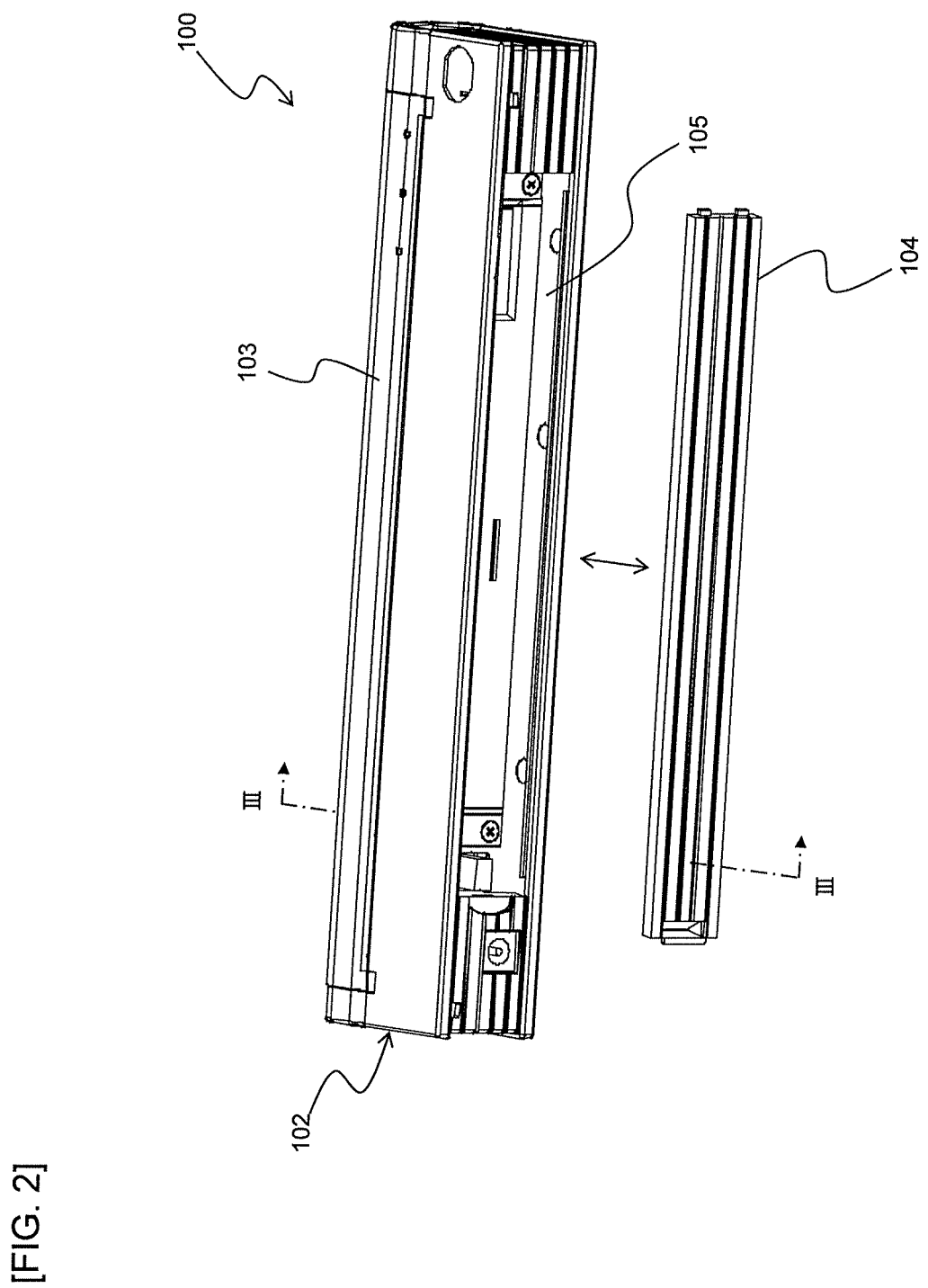
[FIG. 2]

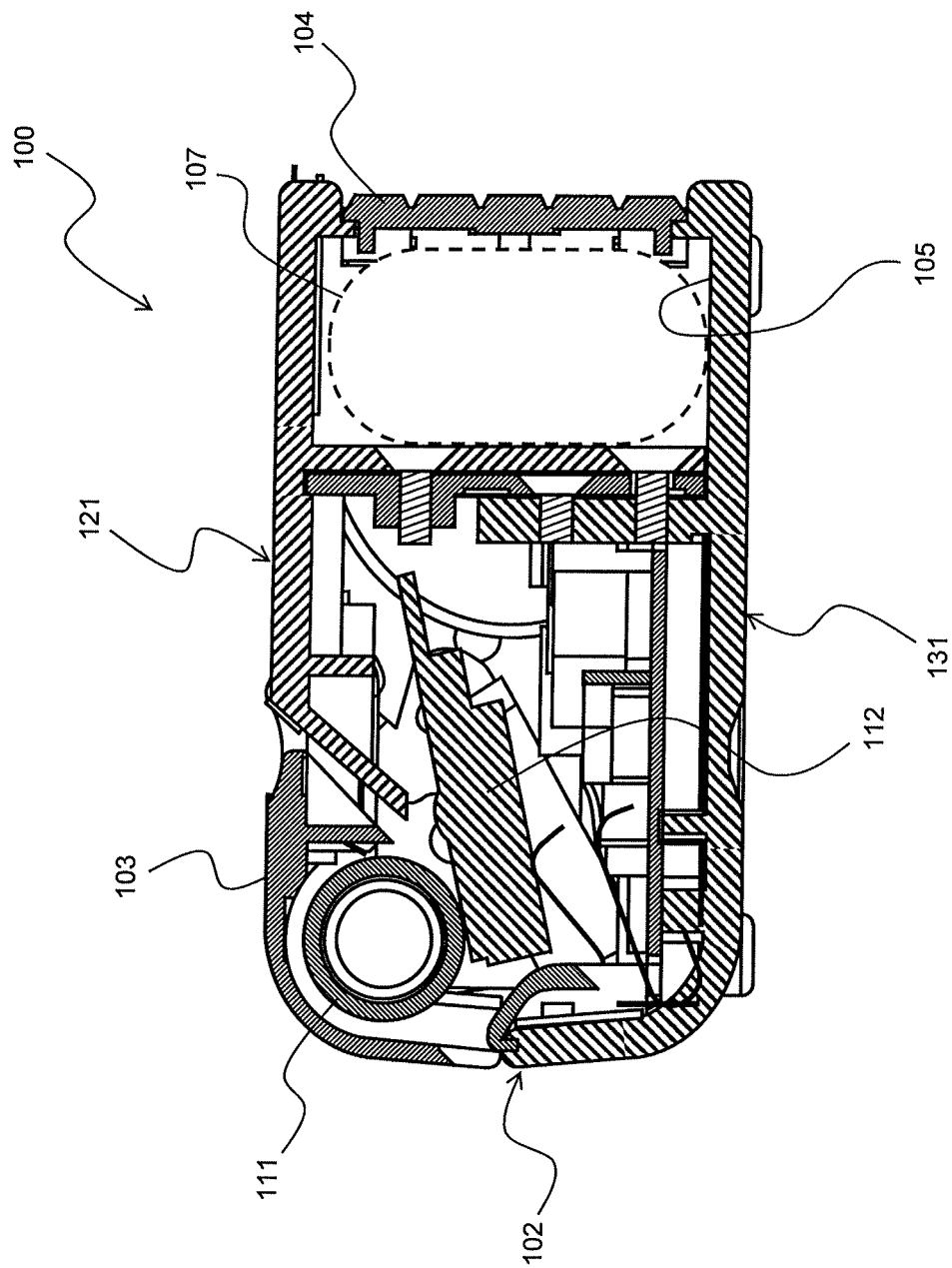
[FIG. 3]

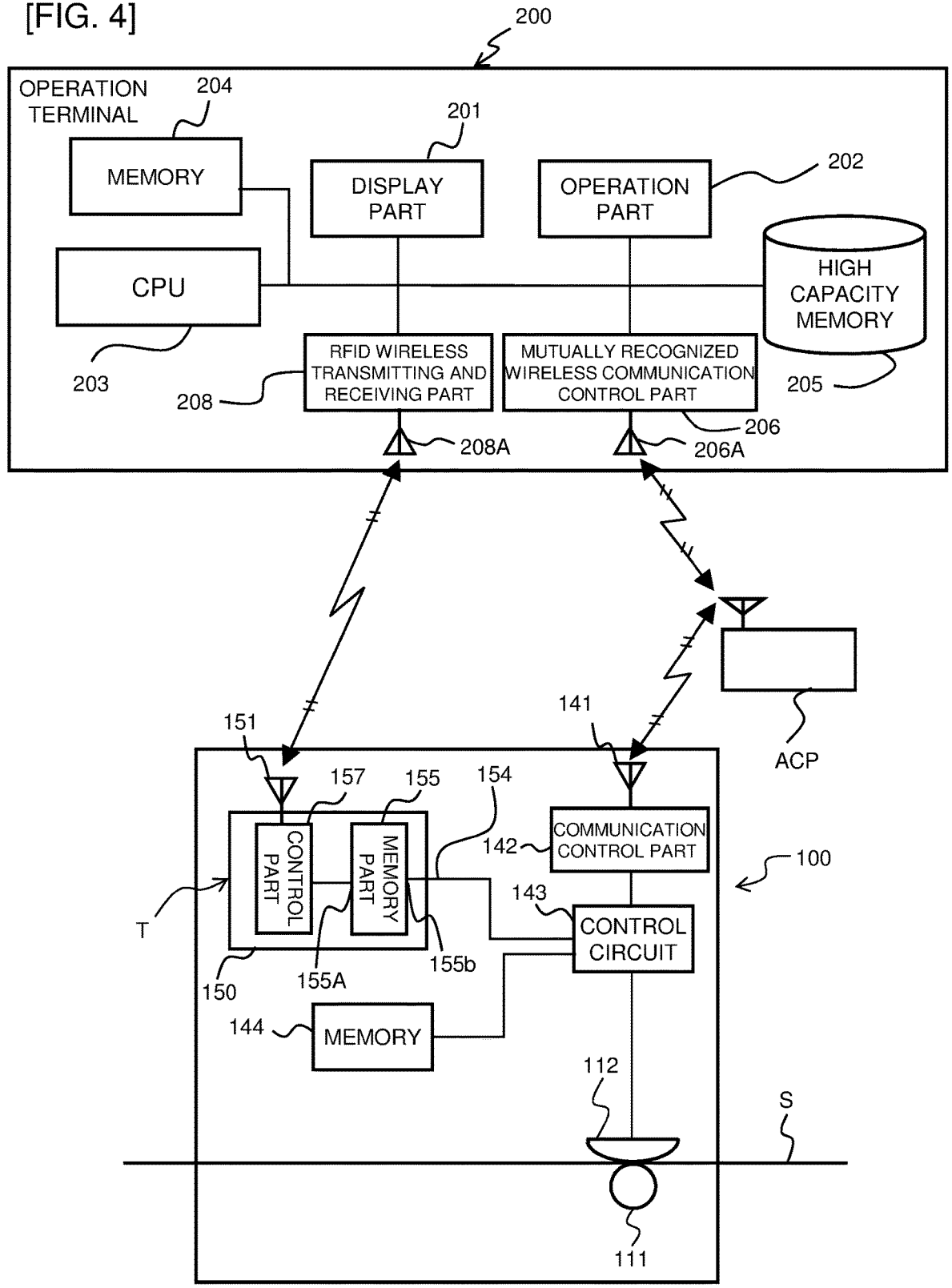
[FIG. 4]

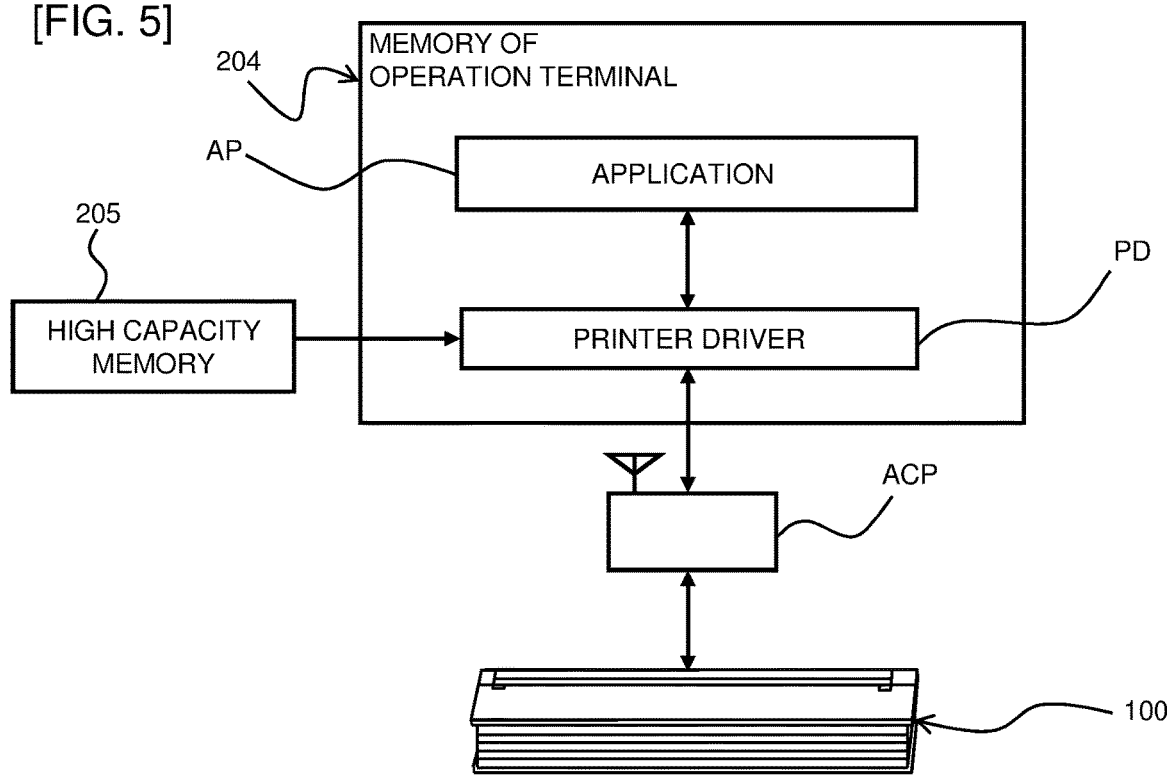
[FIG. 5]
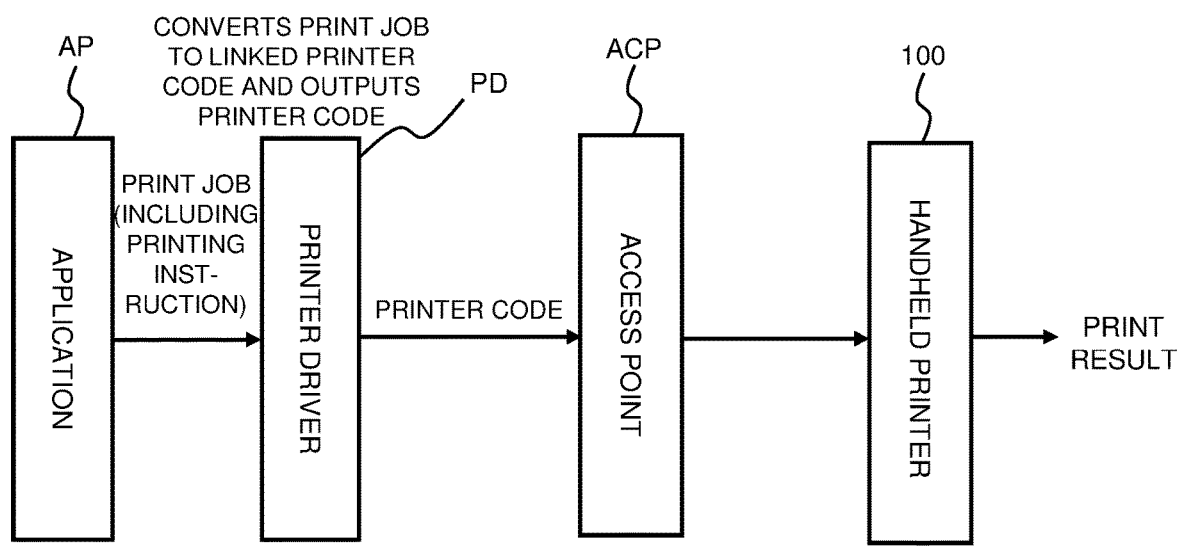
[FIG. 6]

[FIG. 7A]

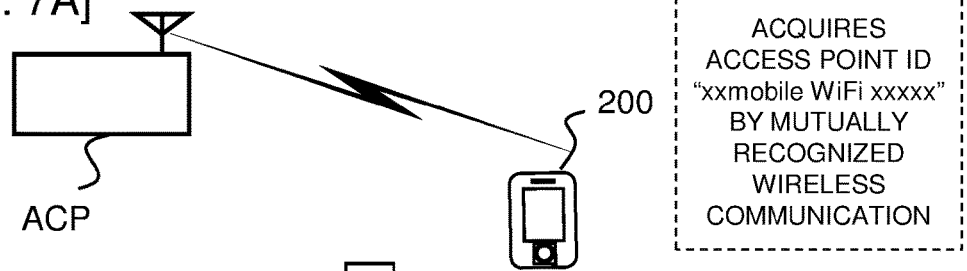

ACQUIRES ACCESS POINT ID "xxmobile WiFi xxxxx" BY MUTUALLY RECOGNIZED WIRELESS COMMUNICATION

[FIG. 7B]

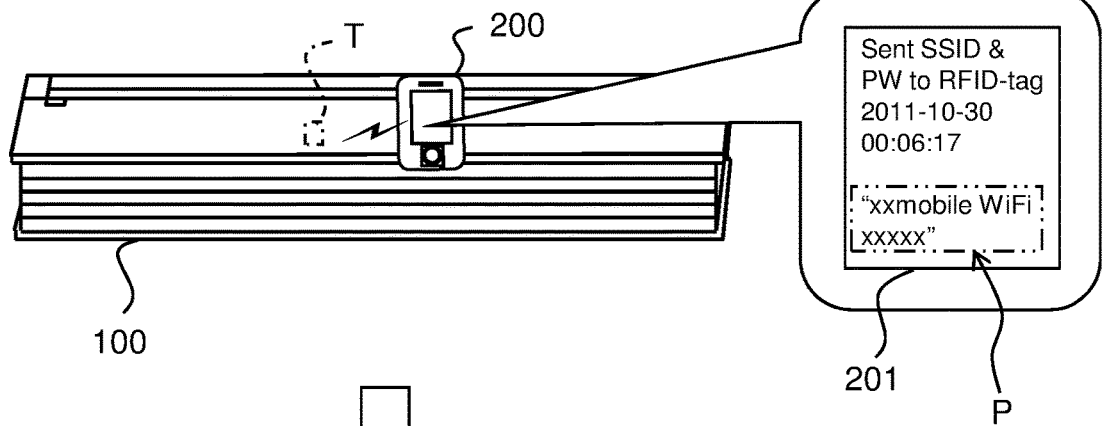

WRITES ACCESS POINT ID "xxmobile WiFi xxxxx" BY TAG COMMUNICATION

Sent SSID & PW to RFID-tag
2011-10-30 00:06:17

"xxmobile WiFi xxxxx"

[FIG. 7C]

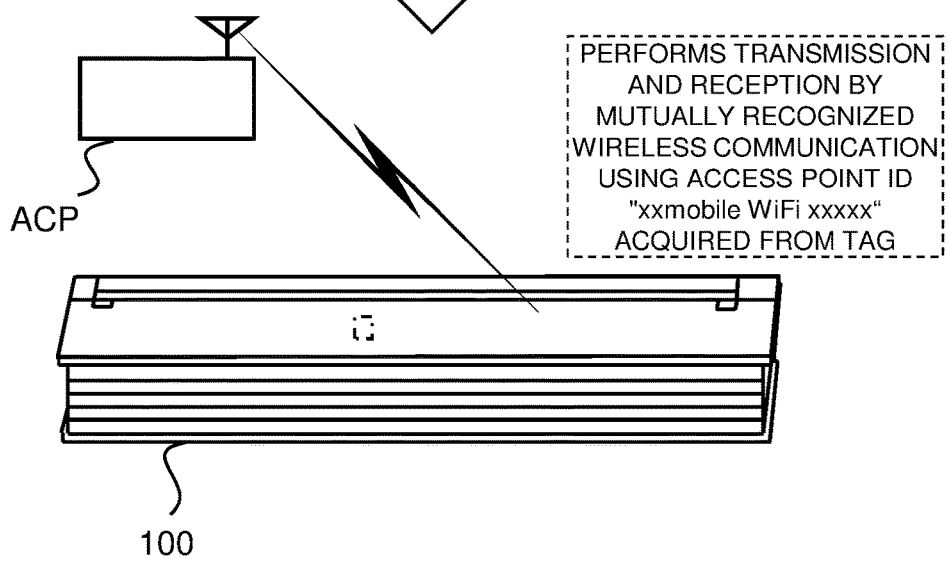

PERFORMS TRANSMISSION AND RECEPTION BY MUTUALLY RECOGNIZED WIRELESS COMMUNICATION USING ACCESS POINT ID "xxmobile WiFi xxxxx" ACQUIRED FROM TAG

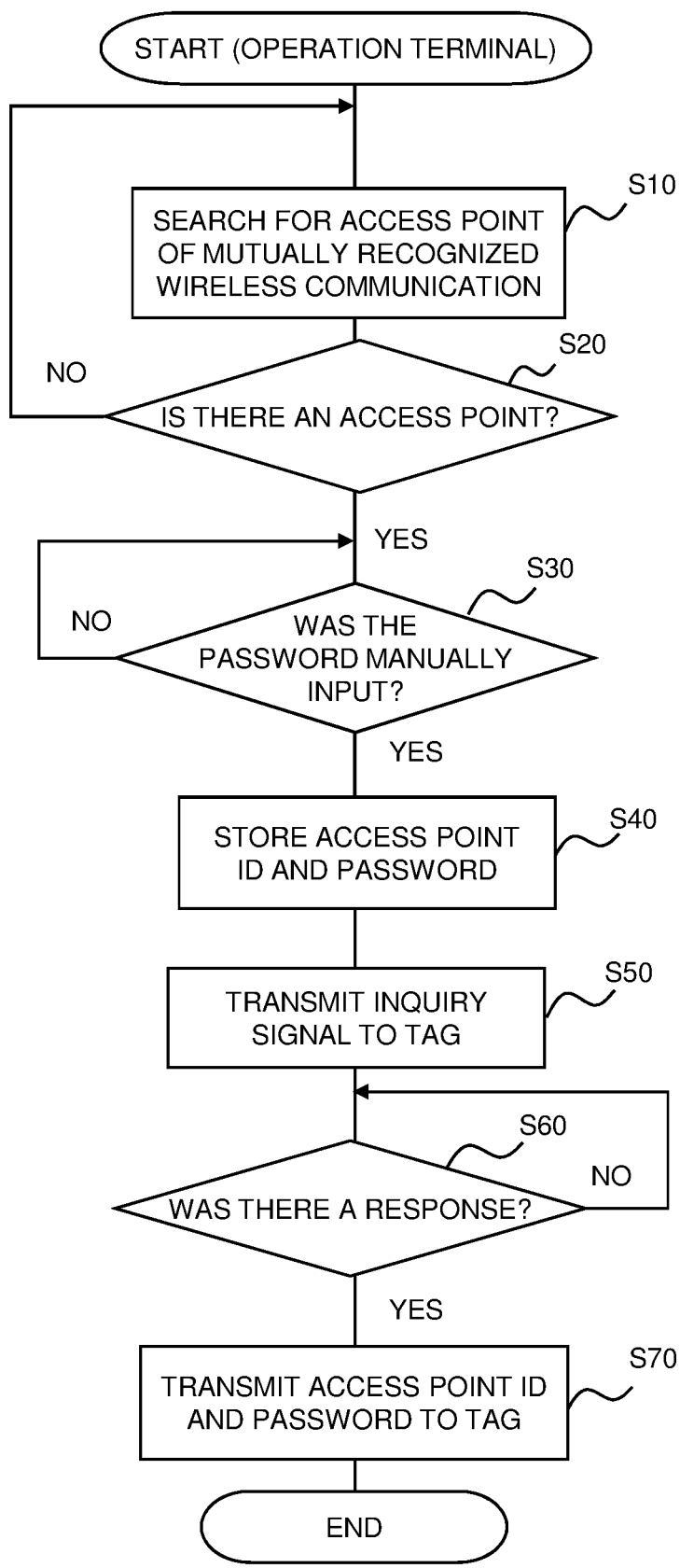
[FIG. 8]

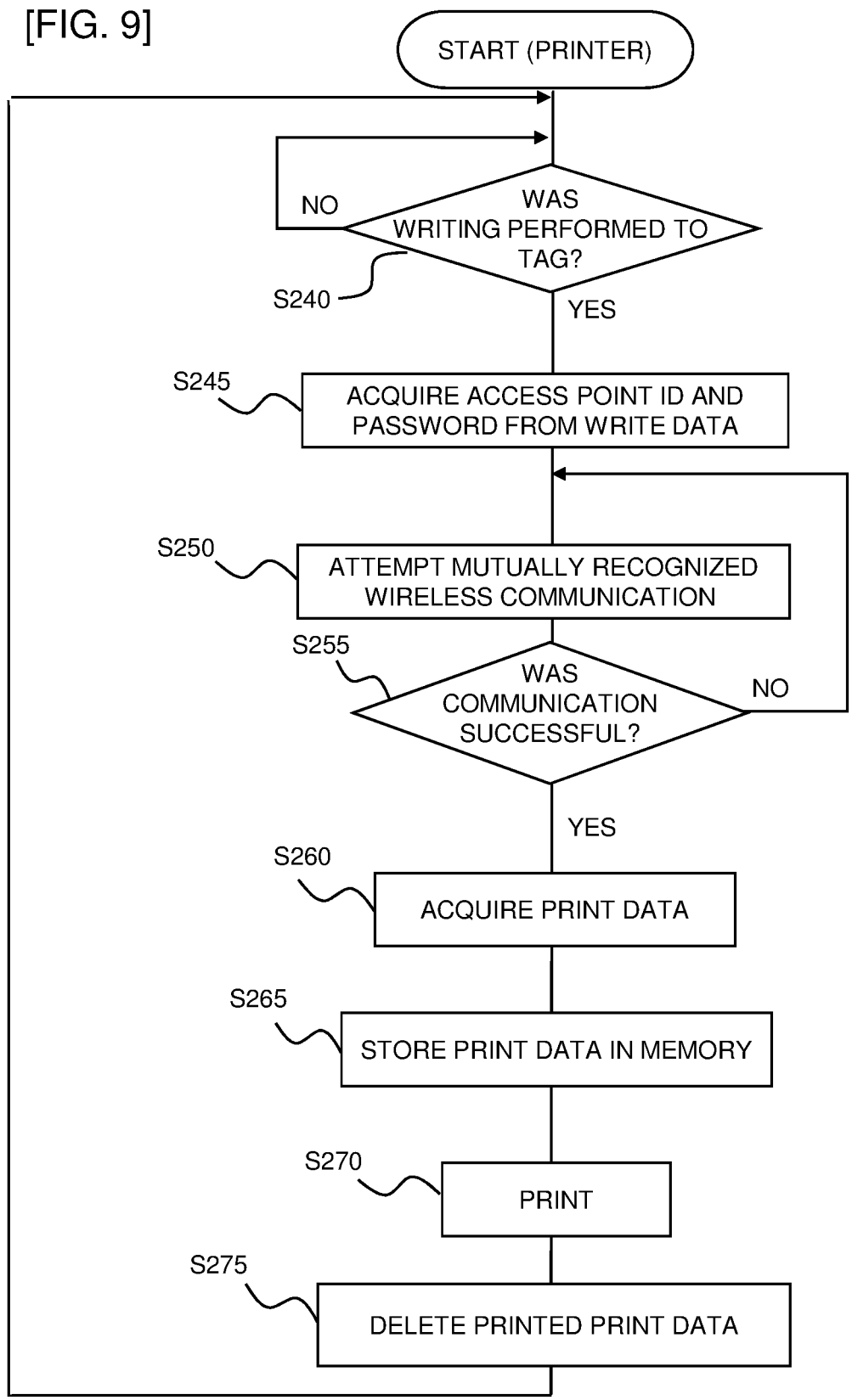
[FIG. 9]

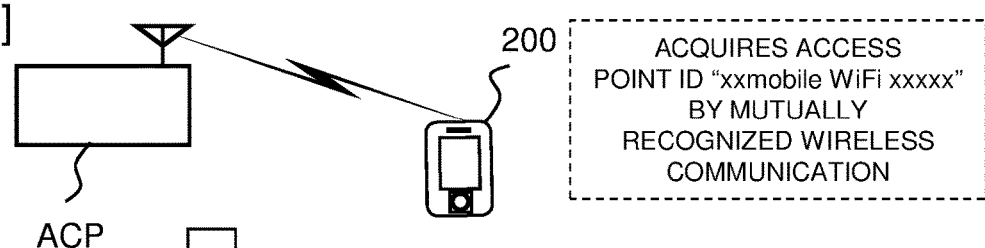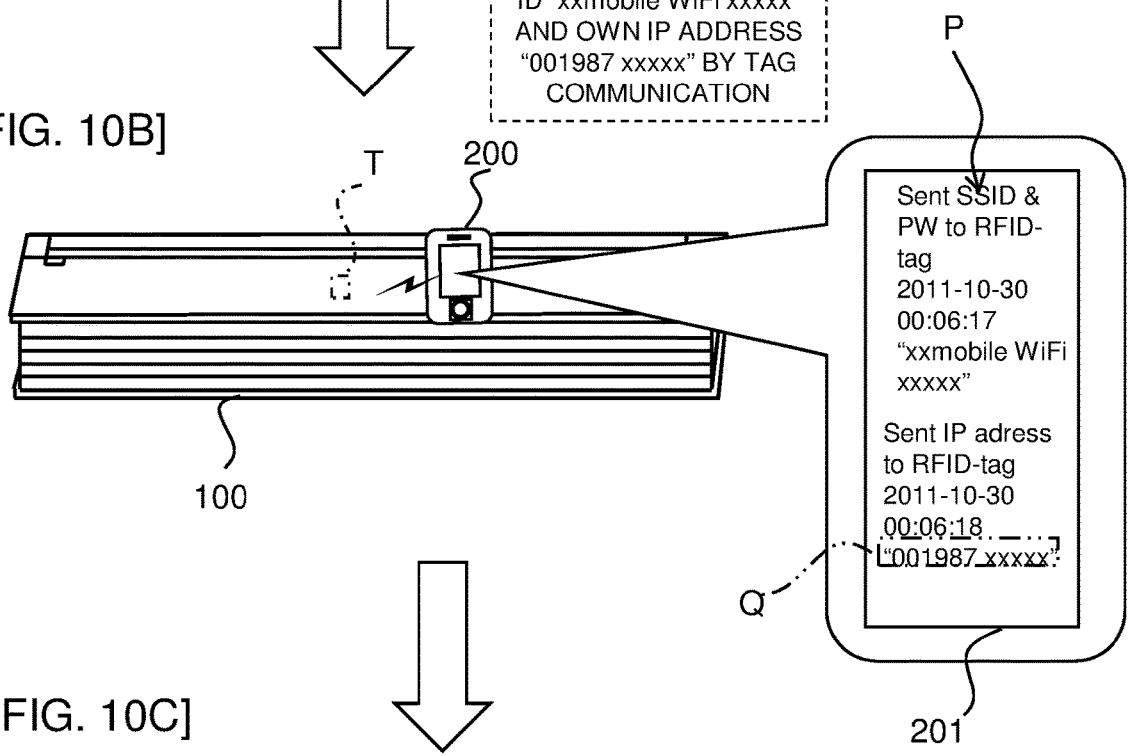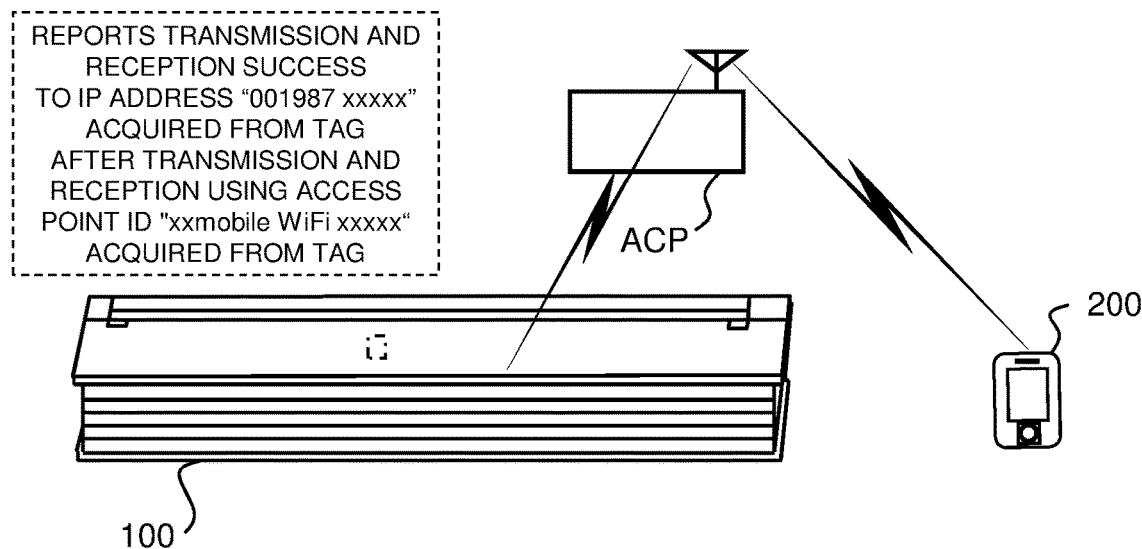

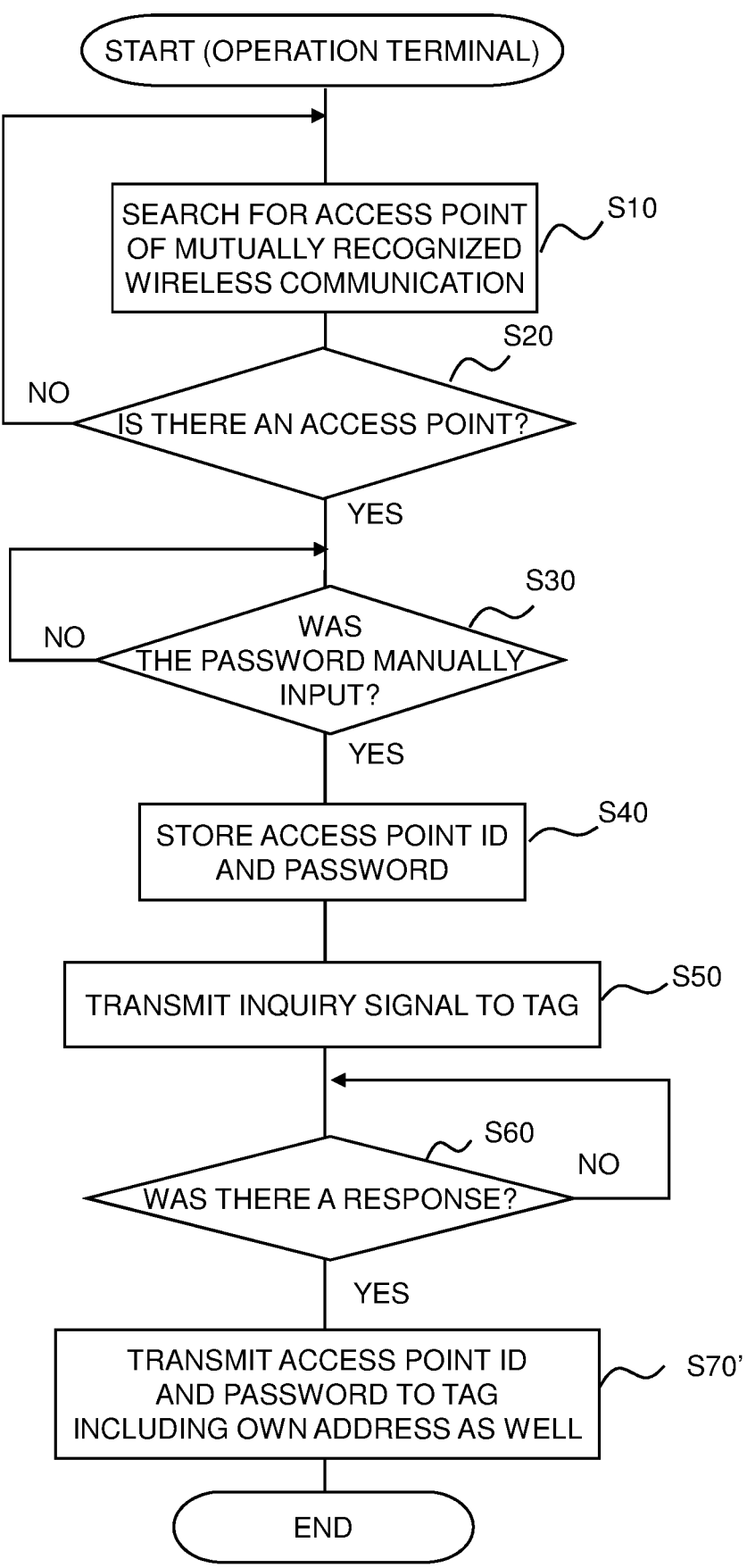
[FIG. 11]

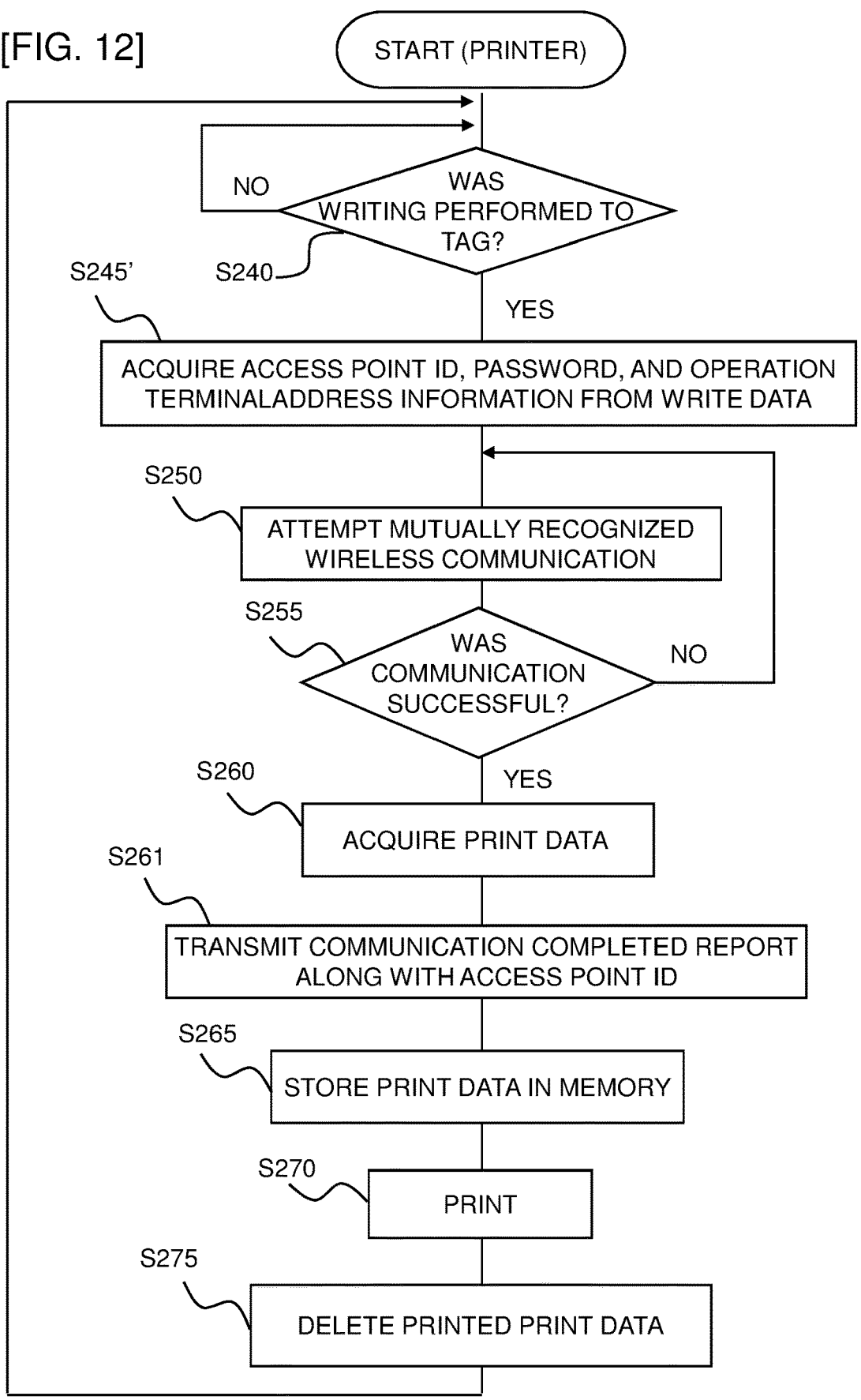
[FIG. 12]

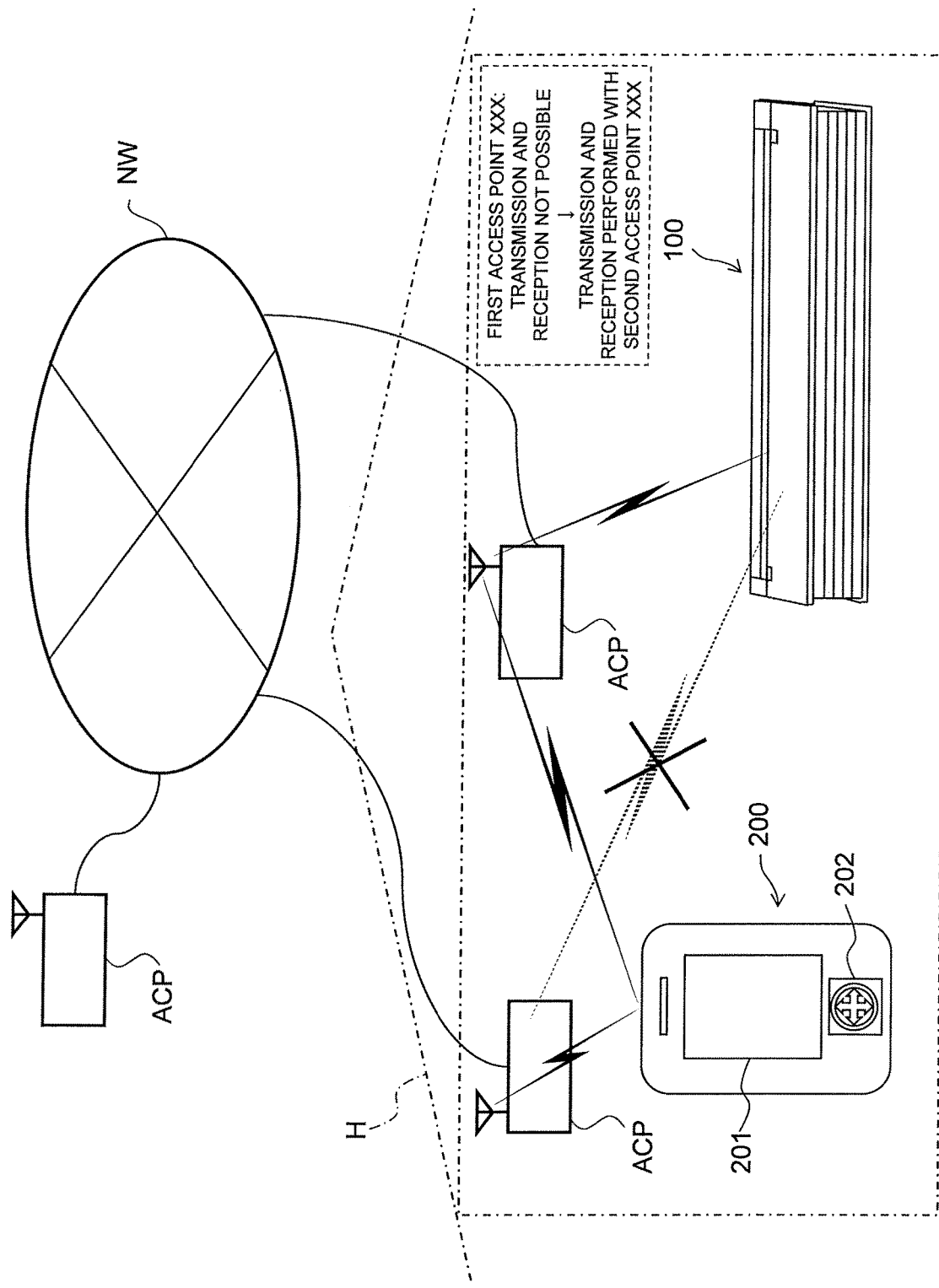
[FIG. 13]

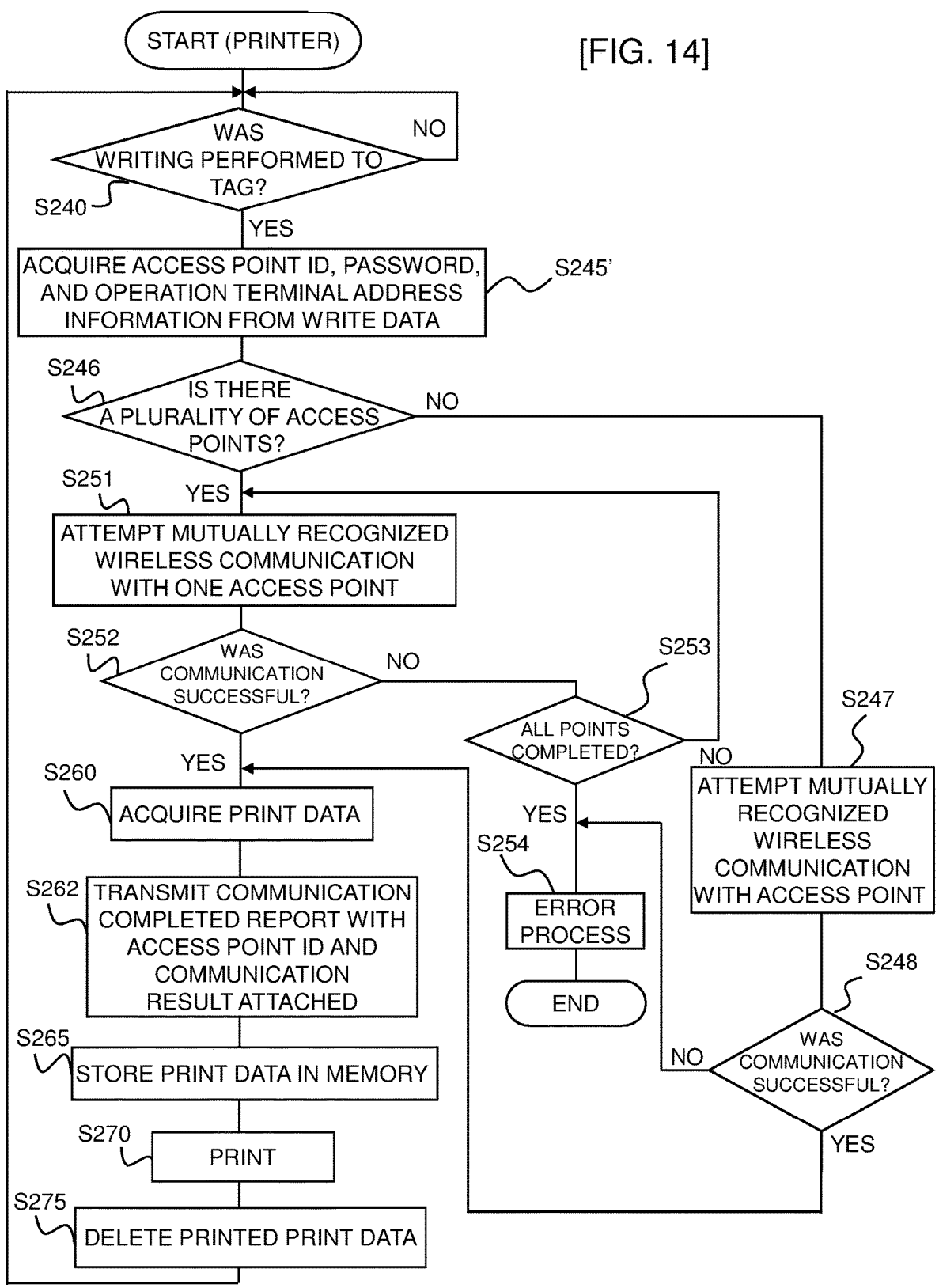
[FIG. 14]

PRINTER

CROSS-REFERENCE TO RELATED APPLICATION

The present application is a continuation application of U.S. application Ser. No. 13/846,964 filed on Mar. 19, 2013, which claims priority from Japanese Patent Application No. 2012-069806, which was filed on Mar. 26, 2012, the disclosure of which is incorporated herein by reference in its entirety.

BACKGROUND

Field

The present disclosure relates to a printer that performs desired printing on a print-receiving medium.

Description of the Related Art

The prior art for transmitting and receiving print data for printing by wireless communication using a printer that performs printing on a print-receiving medium is already known. According to this prior art, the printer acquires the desired print data from a base station (access point) of a wireless LAN that covers the used location of the printer, and performs printing based on the print data.

As described above, in a case of a printer that acquires print data from an access point by wireless communication, the prior art described above which requires the printer to be connected to the access point in an information transmittable and receivable manner requires the user who newly purchased the printer to set a connection between the access point and printer by manually operating a specific button on the operation panel provided to the access point, for example. Further, in addition to the technique of the prior art described above, a technique for connecting an operation terminal, such as a PC, to a printer by a wired connection and setting the connection between the printer and access point by an operation from the operation terminal is also known, for example. In either case, however, the user must manually operate the access point and operation terminal, which is extremely troublesome. As a result, the user cannot perform desired printing quickly and easily.

SUMMARY

It is therefore an object of the present disclosure to provide a printer that does not require troublesome manual operations for connection with an access point, making it possible for the user to perform desired printing quickly and easily.

In order to achieve the above-described object, according to the aspect of the present application, there is provided a printer comprising a feeder configured to feed a print-receiving medium, a printing head configured to perform printing on the print-receiving medium fed by the feeder, a printer RFID tag comprising a tag antenna configured to transmit and receive information by predetermined tag communication, and an IC circuit part configured to store information, a communication antenna configured to transmit and receive information by mutually recognized wireless communication, which differs from the tag communication performed by the tag antenna, and a control device. The control device being configured to execute an information acquisition process for acquiring access point information related to an access point by wired communication via a wired communication connecting part from the printer RFID tag, the access point information being acquired by the printer RFID tag from a handheld terminal by the tag communication using the tag antenna, the access point being a base station of the mutually recognized wireless communication, a transmission and reception attempting process for attempting information transmission and reception with an access point corresponding to the access point information acquired by the information acquisition process, by means of the mutually recognized wireless communication using the communication antenna, a data acquisition process for acquiring desired print data acquired by the mutually recognized wireless communication using the communication antenna when information transmission and reception by the transmission and reception attempting process succeed, and a printing control process for controlling the feeder and the printing head so that printing of the print data acquired by the data acquisition process is performed on the print-receiving medium.

According to the printer of the present disclosure, when feeder feeds a print-receiving medium, printing head performs printing on that fed print-receiving medium. At this time, the print data for printing is acquired by mutually recognized wireless communication. That is, the printer of the present disclosure comprises a communication antenna. In the data acquisition process, the desired print data is acquired by mutually recognized wireless communication via the communication antenna. In the print control process, the feeder and printing head is controlled, thereby the printing linked to the desired print data is performed on the print-receiving medium.

As described above, in a case of a printer that acquires print data by mutually recognized wireless communication, the printer must be connected to an access point, which is a base station of mutually recognized wireless communication that covers the used area of the printer, in an information transmittable and receivable manner. As a result, the user who newly purchased the printer must normally, for example, connect an operation terminal, such as a PC, to the printer by a wired connection and set the connection between the printer and access point by the mutually recognized wireless communication by performing an operation from the operation terminal, which is troublesome.

Here, in response to the above, the present disclosure utilizes tag communication between a handheld terminal and the printer to improve the convenience of setting the mutually recognized wireless communication. That is, a printer RFID tag comprising a tag antenna that performs tag communication is provided to the printer. Further, in addition to a function that performs the mutually recognized wireless communication, the handheld terminal is provided with a function that performs tag communication with the printer RFID tag. Then, first the mutually recognized wireless communication is performed with a suitable access point by the handheld terminal, and the handheld terminal acquires the access point information related to the access point, which includes an access point ID, etc., in advance. In this state, for example, the handheld terminal is brought near the printer RFID tag, causing the access point information acquired by the handheld terminal to be written to the printer RFID tag via the tag communication.

The written access point information is acquired in the information acquisition process by the printer via wired communication with the printer RFID tag. Then, using this acquired access point information, information transmission and reception with the linked access point is attempted by mutually recognized wireless communication in the transmission and reception attempting process. If information transmission and reception by the transmission and reception attempting process succeed, the desired print data is acquired by mutually recognized wireless communication with the access point in the data acquisition process.

As described above, the present disclosure delivers the access point information acquired by the handheld terminal in advance to the printer RFID tag, making the printer easily connectable to the access point in an information transmittable and receivable manner using that access point information. With this arrangement, the user can quickly and easily perform desired printing, even in a case where the user newly purchased the printer, for example.

BRIEF DESCRIPTION OF THE DRAWINGS

FIG. 1 is a system configuration diagram showing the printer of an embodiment of the present disclosure, along with an operation terminal.

FIG. 2 is a perspective view of the outer appearance of a handheld printer, as viewed diagonally from the rear.

FIG. 3 is a lateral cross-sectional view along line III-III in FIG. 2 showing the internal structure of the handheld printer.

FIG. 4 is a block diagram showing the functional configuration of the handheld printer and operation terminal.

FIG. 5 is a block diagram showing one example of the functional configuration of the process control within an operation terminal.

FIG. 6 is a diagram conceptually explaining the flow of information from the operation terminal to the handheld printer.

FIG. 7A is an explanatory view showing the behavior of mutual information transmission and reception between the operation terminal, access point, and handheld printer.

FIG. 7B is an explanatory view showing the behavior of mutual information transmission and reception between the operation terminal, access point, and handheld printer.

FIG. 7C is an explanatory view showing the behavior of mutual information transmission and reception between the operation terminal, access point, and handheld printer.

FIG. 8 is a flowchart showing the control contents executed by the CPU of the operation terminal.

FIG. 9 is a flowchart showing the control contents executed by the control circuit of the handheld printer.

FIG. 10A is an explanatory view showing the behavior of mutual information transmission and reception between the operation terminal, access point, and handheld printer, in a modification where a transmission and reception success report is transmitted.

FIG. 10B is an explanatory view showing the behavior of mutual information transmission and reception between the operation terminal, access point, and handheld printer, in a modification where a transmission and reception success report is transmitted.

FIG. 10C is an explanatory view showing the behavior of mutual information transmission and reception between the operation terminal, access point, and handheld printer, in a modification where a transmission and reception success report is transmitted.

FIG. 11 is a flowchart showing the control contents executed by the CPU of the operation terminal.

FIG. 12 is a flowchart showing the control contents executed by the control circuit of the handheld printer.

FIG. 13 is a system configuration diagram showing the operation terminal along with the handheld printer in a modification where there is a plurality of access points.

FIG. 14 is a flowchart showing the control contents executed by the control circuit of the handheld printer.

DETAILED DESCRIPTION OF PREFERRED EMBODIMENTS

The following describes one embodiment of the present disclosure with reference to accompanying drawings.

System Configuration

FIG. 1 shows a handheld printer 100 of this embodiment along with an operation terminal 200 for operating the handheld printer 100. In FIG. 1, the handheld printer 100 and the operation terminal 200 are connected to an access point ACP that exists inside a building H (in this example, the home of a user, for example) in an information transmittable and receivable manner by suitable mutually recognized wireless communication such as so-called WiFi (note: registered trademark), for example. Note that the access point ACP inside the above described building H is connected to a plurality of other access points ACP via a suitable network NW.

The operation terminal 200, for example, is an information terminal such as a PDA (handheld information terminal) comprising a function linked to the above described mutually recognized wireless communication, a smart phone (handheld telephone comprising a PDA function), etc. This operation terminal 200 comprises a touch panel 201 and an operation button 202, for example. The touch panel 201 comprises a display function that displays various information and messages by a liquid crystal display, etc., and permits the operator to input desired instructions and information in conjunction with the above described operation button 202. Accordingly, hereinafter, the above described display function section of the touch panel is simply referred to as the "display part 201", and the above described operation function section of the touch panel and the above described operation button are simply referred to as the "operation part 202." The operation terminal 200, for example, is capable of transmitting print data to the handheld printer 101 by mutually recognized wireless communication via one of the access points ACP, and causing the desired printing to be performed by the handheld printer 100.

Printer Configuration

The following describes the general configuration of the above described handheld printer 100 with reference to FIG. 2 and FIG. 3.

The handheld printer 100 comprises a housing 102 formed into an overall substantially cuboid shape. A cover member 103 is openably and closeably provided to the upper surface of the housing 102 on the rear side in the drawing. During printing, a print-receiving paper S (refer to FIG. 4 described later) is inserted into the gap (not shown) of this cover member 103. The lateral surface of the housing 102 positioned on the front side in FIG. 2 is equivalent to the rear surface section of the handheld printer 100, and a battery chamber cover 104 is detachably provided to this rear surface section. In a state where the battery chamber cover 104 is removed, a battery storage chamber 105 that stores a battery power source 107 (refer to FIG. 3) opens to the rear surface section of the housing 102.

A platen roller 111 and a thermal line head 112 are provided inside the housing 102. The platen roller 111 is rotatably supported in the interior of the housing 102, and the print-receiving paper S is fed when rotationally driven by a drive mechanism (not shown). The thermal line head 112 is provided to the above described platen roller 111 so that it can make contact with or part from the platen roller 111, contacts the platen roller 111 under a predetermined contact pressure during printing, and performs desired printing on the print-receiving paper S inserted therebetween.

Normally, the print-receiving paper S is inserted into the feeding path of the gap with the cover member 103 closed, causing the print-receiving paper S to be fed by the platen roller 111 and desired printing to be performed by the thermal line head 112 on the print-receiving paper S. Note that the cover member 103 is opened for paper jam removal. At this time, the platen roller 111 is released from the thermal line head 112, making it possible to easily take out the paper.

The housing 102 comprises a top cover 121, an undercover 131, and two side covers (not shown).

Functional Configuration of Printer and Operation Terminal

The functional configuration of the handheld printer 100 and the operation terminal 200 will now be described with reference to FIG. 4.

In FIG. 4, the handheld printer 100 comprises the above described thermal line head 112 that performs desired printing on the print-receiving paper S, the above described platen roller 111, a control circuit 143, a memory 144 made of RAM, ROM, etc., for example, a communication control part 142 that controls the above described mutually recognized wireless communication performed with the above described access point ACP via a printer-side antenna 141, and a printer RFID tag T that makes information transmission and reception possible by predetermined tag communication, which is short range communication via a tag antenna 151. The above described printer-side antenna 141 performs information transmission and reception with the access point ACP by the above described mutually recognized wireless communication, which differs from the above described tag communication performed by the tag antenna 151.

The printer RFID tag T comprises the tag antenna 151, and an IC circuit part 150 that is connected to the tag antenna 151 and capable of storing received access point information P.

The tag antenna 151 is capable of receiving the access point information P (the access point ID which is the identification information of the access point ACP, password, etc.; refer to FIG. 7 described later) acquired by the operation terminal 200 in advance from the operation terminal 200 (details described later). Note that the identification information of the access point ACP is not limited to the access point ID, allowing other information such as a name, code, etc., specific to the access point, for example.

The IC circuit part 150 comprises a control part 157 that controls the operation of the circuit element of the IC circuit part 150, and a memory part 155 that constitutes a dual port type memory, for example. One port 155a of the memory part 155 is connected with the control part 157. Further, the other port 155b of the memory part 155 is an external output terminal, and is connected with the above described control circuit 143 via a wired connecting part 154 for performing wired communication.

The operation terminal 200 comprises a CPU 203, a memory 204 made of RAM, ROM, etc., for example, the above described operation part 202, the above described display part 201, a high capacity memory 205 that is made of a solid state drive device (SSD), etc., and stores various information, an RFID wireless transmitting and receiving part 208 comprising a first antenna 208A, and a mutually recognized wireless communication control part 206 comprising a second antenna 206A.

The RFID wireless transmitting and receiving part 208 transmits the above described access point information P to the handheld printer 100 and writes the access point information P to the printer RFID tag T (refer to FIG. 7B) by wireless communication (the above described tag communication) between the tag antenna 151 of the above described printer RFID tag T and the first antenna 208A, in accordance with the control of the CPU 203. In this example, a short range wireless communication method based on a 13.56-MHz band is used, for example, limiting the communication distance to an area less than 10 cm.

The mutually recognized wireless communication control part 206 controls the transmission and reception of various information, such as the reception of print data transmitted from the operation terminal 200, for example, by mutually recognized wireless communication via the second antenna 206A and the above described access point ACP, in accordance with the control of the CPU 203. According to this communication, the communication distance is assumed as a range of about 10-100 m.

The CPU 203 processes signals in accordance with a program stored in advanced in ROM while utilizing the temporary storage function of RAM, thereby transmitting and receiving various instruction and information signals with the handheld printer 100. Note that the programs stored in ROM include a program for executing the printing process.

A program for converting a printing instruction to printer code (details omitted) per predetermined format type, such as character style, font, etc., is stored in the high capacity memory 205 (or the memory 204).

Process Flow of Operation Terminal

Next, the functional configuration and flow of the processing within the operation terminal 200 will be described with reference to FIG. 5 and FIG. 6.

In FIG. 5, at least one program each of an application program AP and a program of a printer driver PD are opened and started on the above described memory 204 of the operation terminal 200, enabling transmission and reception of instruction and information signals between the two. Then, the application program AP transmits and receives signals with the printer driver PD, and the printer driver PD transmits and receives signals with the above described high capacity memory 205 and enables transmission and reception of information with the handheld printer 100 via the above described communication control part 206, the above described access point ACP, and the above described communication control part 142.

The application program AP and the printer driver PD are both executed by the single above described CPU 203 of the operation terminal 200. That is, each are individually and independently executed on the CPU 203 by time sharing interrupt control of a known time sharing system (TSS), for example. Further, in the printer driver PD, there may be a program that is incorporated in advance in the fundamental OS of the operation terminal 200 or individually started on the OS in the same manner as other applications.

Here, the application program AP is a document generation or image generation application program, such as, for example, a document management application program for the generation and management of documents or an image management application program for the generation and management of images such as photographs and illustrations, etc. Then, the application program AP generates a print job that includes a printing instruction linked with an operation of the operation part 202 by the operator, and that generated print job is output from the application program AP to the printer driver PD.

Then, as shown in FIG. 6, the printer driver PD receives the above described print job output from the application program AP, and converts the printing instruction included in the print job to linked printer code. Then, the printer code (print data) thus converted can be output to the handheld printer 100 via the above described access point ACP. The handheld printer 100 performs the required various processing and subsequently the required printing based on the printer code input from the printer driver PD. Note that the printing process program for executing the printing process shown in the flow of FIG. 6 previously described is a program that includes both the above described application program AP and printer driver PD.

Special Characteristics of this Embodiment

In the above described basic configuration, the special characteristics of the handheld printer 100 of this embodiment lie in the fact that the above described access point information P related to the access point ACP is acquired by tag communication, automatically setting the connection with the access point ACP (without a manual operation by the user). In the following, the details of this procedure will be described in order.

According to the handheld printer 100 of this embodiment, print data (the above described printer code) is acquired by the above described mutually recognized wireless communication with the access point ACP via the printer-side antenna 141, as previously described. Thus, in a case where print data is to be acquired by mutually recognized wireless communication, the handheld printer 100 must be connected to the above described access point ACP that covers the used area of the handheld printer 100 in an information transmittable and receivable manner. For example, in a case where the user newly purchased the above described handheld printer 100, for example, the user must connect the PC, etc., by wire to the above described handheld printer 100 and set the connection between the handheld printer 100 and the access point ACP by the above described mutually recognized wireless communication by performing an operation from the PC, etc., which is troublesome.

Technique of this Embodiment

Here, according to this environment, the access point information P acquired by the operation terminal 200 in advance is delivered to the printer RFID tag T by the above described tag communication. With this arrangement, the handheld printer 100 is reliably connected to the access point ACP in an information transmittable and receivable manner using that access point information P.

That is, as shown in FIG. 7A, mutually recognized wireless communication is first performed with the suitable access point ACP via the mutually recognized wireless communication control part 206 and the second antenna 206A of the operation terminal 200. Then, the access point ID "xxmobile WiFi xxxxx" related to the access point ACP is acquired by the operation terminal 200 in advance. Note that, at this point, according to this embodiment, the password of the access point ACP is already known by the user and input into the operation terminal 200 at suitable timing (by manual input using the operation part 202, for example). The operation terminal 200 stores the above described acquired access point ID and password (which make up the above described access point information P) in the memory 204, for example.

In this state, as shown in FIG. 7B, for example, the operation terminal 200 is brought near the handheld printer 100, causing the above described access point information P (the access point ID "xxmobile WiFi xxxxx" and password in the example shown) acquired by the above described operation terminal 200 to be written to the printer RFID tag T of the above described handheld printer 100 via the above described tag communication. In the example shown, "Sent SSID and PW to RFID-tag" indicating that the access point information P was written to the above described printer RFID tag T, the communication time "2011-10-30 00:06:17", the access point information P "xxmobile WiFi xxxxx", and the like are displayed on the display part 201 of the operation terminal 200 at this time. The access point information P written to the above described printer RFID tag T is acquired by the memory 144 of the handheld printer 100 via the above described wireless communication.

Then, as shown in FIG. 7C, the printer-side antenna 141 of the communication control part 142 attempts information transmission and reception by the mutually recognized wireless communication with the linked access point ACP using this acquired access point information P. If the information transmission and reception succeed, the control circuit 143 within the handheld printer 100 acquires the above described print data transmitted from the operation terminal 200 using the mutually recognized wireless communication control part 206 and the second antenna 206A as previously described, for example, by the mutually recognized wireless communication with the access point ACP. Then, the handheld printer 100 can perform printing on the print-receiving paper S using the acquired print data.

Control Procedure of Operation Terminal

The control contents that are based on the above described printing process program and executed by the above described CPU 203 of the operation terminal 200 in order to achieve the above described contents will now be described with reference to FIG. 8.

First, in step S10, the CPU 203 searches for the access point ACP of mutually recognized wireless communication using a known suitable technique, via the mutually recognized wireless communication control part 206 and the second antenna 206A.

Subsequently, in step S20, the CPU 203 determines whether or not there is an access point ACP detected by the search of step S10. In a case where there is not a detected access point ACP, the decision is made that the condition of step S20 is not satisfied (S20: No), the flow returns to step S10, and the same procedure up to and including the search for the access point ACP is repeated. In a case where there is a detected access point ACP (in this case, the access point ID of the access point ACP is acquired), the decision is made that the condition of step S20 is satisfied (S20: Yes), and the flow proceeds to step S30.

In step S30, the CPU 203 determines whether or not an operator manually input the password of the operation terminal 200 via the operation part 202. Until the password is manually input, the decision is made that the condition of step S30 is not satisfied (S30: No), and the flow loops and enters a standby state. When the password is manually input, the decision is made that the condition of step S30 is satisfied (S30: Yes), and the flow proceeds to step S40.

In step S40, the CPU 203 stores the access point information P (the access point ID "xxmobile WiFi xxxxx" acquired by the search of step S10 and the password input in step S30 in the above described example) related to the access point ACP found in step S20 in the memory 204 (or the high capacity memory 205) of the operation terminal 200.

Subsequently, in step S50, the CPU 203 generates an inquiry signal that requests a response from the printer RFID tag T, and transmits the signal to the printer RFID tag T of the handheld printer 100 via the RFID wireless transmitting and receiving part 208 and the first antenna 208A.

Then, in step S60, the CPU 203 determines whether or not a response signal from the above described printer RFID tag T was received via the first antenna 208A and the RFID wireless transmitting and receiving part 208 in response to the above described inquiry signal. Until the response signal is received, the decision is made that the condition of step S60 is not satisfied (S60: No), and the flow loops and enters a standby state. When the response signal is received, the decision is made that the condition of step S60 is satisfied (S60: Yes), and the flow proceeds to step S70.

In step S70, the CPU 203 transmits the access point ID ("xxmobile WiFi xxxxx" in the above described example) and password of the access point ACP stored in the above described step S40 to the printer RFID tag T via the first antenna 208A and the RFID wireless transmitting and receiving part 208. After this step S70 is completed, the flow is terminated.

Printer Control Procedure

On the other hand, the printing process contents executed by the control circuit 143 of the handheld printer 100 will be described with reference to FIG. 9.

In FIG. 9, first, in step S240, the control circuit 143 determines whether or not the access point information (access point ID and password) transmitted from the operation terminal 200 in step S70 of the above described FIG. 8 was written to the printer RFID tag T (specifically, the above described memory part 155) by tag communication via the tag antenna 151. Until the above described access point information P is acquired, the decision is made that the condition of step S240 is not satisfied (S240: No), and the flow loops and enters a standby state. When the access point information P is acquired, the decision is made that the condition of step S240 is satisfied (S240: Yes), and the flow proceeds to step S245.

In step S245, the control circuit 143 acquires the access point information P acquired in the printer RFID tag T in step S240 via the above described wired communication and stores it in the memory 144, for example.

Subsequently, in step S250, the control circuit 143 attempts information transmission and reception with the access point ACP linked to the access point information P (that is, identified by the access point ID) acquired in the above described step S240, by mutually recognized wireless communication using the communication control part 142 and the printer-side antenna 141.

Then, the flow proceeds to step S255 where the control circuit 143 determines whether or not the attempted communication of information transmission and reception in step S250 succeeded. In a case where the attempted communication has not succeeded, the decision is made that the condition is not satisfied (S255: No), the flow returns to step S250, and the same procedure is repeated. In a case where the above described attempted communication succeeded, the decision is made that the condition is satisfied (S255: Yes), and the flow proceeds to step S260.

In step S260, the control circuit 143 acquires print data from the access point ACP by mutually recognized wireless communication using the communication control part 142 and the printer-side antenna 141.

Note that the acquisition of the print data in this step S260 may be performed by the above described mutually recognized wireless communication from a terminal other than the operation terminal 200 of the PDA (handheld information terminal) or smart phone (handheld telephone comprising the PDA function), etc., described above, such as from a general-purpose computer PC (refer to FIG. 1), etc., connected to the wireless communication line NW (WiFi network). In this case, the operation terminal 200 plays the role of constructing the connection setting with the access point ACP for acquisition of the print data by the handheld printer 100 from the above described other terminal.

Subsequently, in step S265, the control circuit 143 stores the print data acquired in the above described step S260 in the above described memory 144 made of RAM, ROM, etc., for example.

Then, in step S270, the control circuit 143 controls the platen roller 111 and the thermal line head 112 in coordination, and performs desired printing on the print-receiving paper S using the print data stored in the memory 144 in the above described step S265.

Then, in step S275, the control circuit 143 deletes the above described print data linked to the contents printed in the above described step S270 from the above described memory 144. Subsequently, the flow returns to step S240, and the same procedure is repeated.

As described above, according to this embodiment, the access point information P acquired by the operation terminal 200 in advance is delivered to the printer RFID tag T, causing the handheld printer 100 to be connected to the access point ACP in an information transmittable and receivable manner using that access point information P. With this arrangement, when the user purchases and arranges the new handheld printer 100 in the building (home) H, for example, the desired print data can be easily transmitted from the operation terminal 200, etc., to the handheld printer 100 via the access point ACP inside the building H. Accordingly, the user can perform desired printing quickly or easily.

Note that the present disclosure is not limited to the above described embodiment, and various modifications may be made without deviating from the spirit and scope of the disclosure. The following describes such modifications one by one. Note that components identical to those in the above described embodiment are denoted using the same reference numerals, and descriptions thereof will be omitted or simplified as appropriate.

(1) When the Printer Transmits a Transmission and Reception Success Report to the Operation Terminal According to this modification, as shown in FIG. 10A, similar to the above described FIG. 7A, first the access point ID "xxmobile WiFi xxxxx" is acquired by mutually recognized wireless communication with the suitable access point ACP by the operation terminal 200.

Subsequently, as shown in FIG. 10B linked to the above described FIG. 7B, the operation terminal 200 is brought near the printer RFID tag T, causing the above described access point information P (the access point ID "xxmobile WiFi xxxxx" in the example shown) acquired by the above described operation terminal 200 and the password manually input by the operator in advance to be written to the printer RFID tag T, as previously described. At this time, according to this modification, in addition to the above described access point information P, address information Q (an IP address "001987 xxxxx" in this example) of the operation terminal 200 itself is also written to the above described printer RFID tag T.

At this time, in the example shown, the IP address "001987 xxxxx" of the above described address information Q, etc., is displayed on the display part 201 of the operation terminal 200 in addition to the same above described "Sent SSID and PW to RFID-tag" indicating that the access point information P was acquired, the communication time "2011-10-30 00:06:17", and the access point information P "xxmobile WiFi xxxxx" as previously described. The access point information P and the address information Q thus written are acquired by the memory 144 of the handheld printer 100 via the above described wired communication, as previously described.

Subsequently, as shown in FIG. 10C, an attempt is made to perform information transmission and reception by mutually recognized wireless communication with the linked access point ACP using the above described acquired access point information P, similar to FIG. 7C previously described. Then, according to this modification, if the information transmission and reception succeed, the operation terminal 200 is identified using the above described address information Q and a report indicating that transmission and reception succeeded is transmitted to the operation terminal 200 by mutually recognized wireless communication via the above described printer-side antenna 141. That is, the operation terminal 200 that delivered the access point information P and the address information Q to the handheld printer 100 as previously described receives a reply indicating that communication succeeded from the handheld printer 100.

Control Procedure of Operation Terminal

FIG. 11 shows the control procedure executed by the CPU 203 of the operation terminal 200 in this modification. The flow shown in FIG. 11 differs from that of the above described embodiment in that step S70' is provided in place of step S70 of FIG. 8. After the same steps S10-S60 as those in FIG. 8, the flow proceeds to the newly provided step S70'. In step S70', the CPU 203 transmits and writes the address information Q (IP address, for example) of the operation terminal 200 in addition to the access point information P and password related to the access point ACP stored in the above described step S40 to the printer RFID tag T via the RFID wireless transmitting and receiving part 208 and the first antenna 208A. This process then terminates here.

Printer Control Procedure

FIG. 12 shows the printing process procedure executed by the control circuit 143 of the handheld printer 100 of this modification. In the flow shown in FIG. 12, step S245' is provided in place of step S245 in the flow of FIG. 9 of the above described embodiment, and step S261 is further newly provided between step S260 and step S265.

That is, after the same step S240 as that of the above described FIG. 9, the flow proceeds to the newly provided step S245'. In step S245', the control circuit 143 acquires the access point information P (including the access point ID and password) acquired in the printer RFID tag T in step S240 via the above described wired communication. Further, in this modification, in addition to the above, the control circuit 143 also acquires the address information (refer to step S70' of FIG. 11) of the operation terminal 200 acquired in the printer RFID tag T in step S240 via the above described wired communication. The various acquired information is stored in the memory 144, for example, in the same manner as described above.

The subsequent steps S250, S255, and S260 are the same as those of the above described FIG. 9. After completion of step S260, the flow proceeds to the newly provided step S261.

In step S261, the control circuit 143 transmits a communication completed report to the address of the above described operation terminal 200 via the access point ACP by the above described mutually recognized wireless communication using the address information of the operation terminal 200 acquired in step S245'. The above described communication completed report reports that communication with the access point ACP in the above described step S255 succeeded and information transmission and reception were performed.

Further, according to this modification, the access point ID of the access point that succeeded in information transmission and reception (while acquired from the printer RFID tag T in step S245' of the above described FIG. 12, the access point ID is also acquired when mutually recognized wireless communication succeeds in the subsequent step S250 as well) is also transmitted to the operation terminal 200 in step S261, attached to the above described communication completed report, for example. With this arrangement, the communication completed report and the access point ID are acquired by the operation terminal 200. The subsequent steps S265, S270, and S275 are the same as those of FIG. 9, and descriptions thereof will be omitted.

In this modification, the success of the printer 100 in performing information transmission and reception with the access point ACP as well as the access point ACP with which the successful connection was made are acquired by the operation terminal 200 by the above described communication completed report. As a result, for example, the operation terminal 200 issues a notification linked to the above described communication completed report, making it possible for the user to recognize by sight or by sound, etc., that the handheld printer 100 definitely connected with the access point ACP and the access point ACP with which the connection was made.

(2) When a Plurality of Access Points Exists

For example, as shown in FIG. 13, in a case where a plurality of access points ACP coexists inside the building H (the home of the user as described above, an office building, or the like, for example), the operation terminal 200 and the handheld printer 100 can communicate with this plurality of access points ACP by mutually recognized wireless communication. According to this modification, the operation terminal 200 acquires a plurality of sets of access point information P respectively related to the above described plurality of access points ACP, and delivers each to the handheld printer 100 by the aforementioned tag communication.

The handheld printer 100 that acquired the above described plurality of sets of access point information P uses the plurality of sets of access point information P to sequentially attempt information transmission and reception with the plurality of access points ACP. At that time, the access point information of the plurality of access points ACP is acquired in list format, for example, and the handheld printer 100 attempts information transmission and reception with each of the access points ACP following the order of that access point information listed. With this arrangement, for example, as shown in FIG. 13, in a case where information transmission and reception could not be performed with the access point ACP stated first in the list due to some circumstance (when a radio wave environment defect occurs or all IP addresses on hand of the access point ACP are in use, for example), information transmission and reception are performed with the next access point ACP stated second (and the same sequentially thereafter).

Printer Control Procedure

The following describes the printing process contents executed by the control circuit 143 of the handheld printer 100 of this modification in order to achieve the above described technique, with reference to the flow of FIG. 14.

According to the flow of FIG. 14, the same step S245' as that in FIG. 12 is provided in place of step S245 of the flow of FIG. 9, and steps S246, S247, S248, S251, S252, S253, and S254 are newly provided between this step S245' and step S260. Further, step S262 is newly provided between step S260 and step S265 of the flow of FIG. 9.

In FIG. 14, after the same step S240 as that in the above described FIG. 9, the flow proceeds to the same step S245' as that in FIG. 12. In step S245', similar to the above described FIG. 12, the control circuit 143 acquires the access point information P and the address information of the operation terminal 200 acquired in the printer RFID tag T in step S240 via the above described wired communication, and stores that information in the memory 144, for example. However, according to this modification, as previously described with reference to FIG. 13, sometimes a plurality of sets (and sometimes one set) of access point information P is acquired in the above described step S240. Subsequently, the flow proceeds to the newly provided step S246.

In step S246, the control circuit 143 determines whether or not there was a plurality of sets of access point information P acquired in the above described step S245' (in other words, whether or not a plurality of sets of accessible access points ACP exists). When a plurality of sets of the access point information P exists, the decision is made that the condition of step S246 is satisfied (S246: Yes), and the flow proceeds to step S251.

In step S251, the control circuit 143 attempts information transmission and reception with one of the plurality of access points ACP made accessible as described above, by mutually recognized wireless communication using the communication control part 142 and the printer-side antenna 141, in the same manner as in the above described step S250 of FIG. 9. Subsequently, the flow proceeds to step S252.

In step S252, the control circuit 143 determines whether or not the attempted communication of information transmission and reception in step S251 succeeded in the same manner as step S252 of the above described FIG. 9. If the attempted communication has not succeeded, the decision is made that the condition of step S252 is not satisfied (S252: No), and the flow proceeds to step S253. If the attempted communication succeeded, the decision is made that the condition of step S252 is satisfied (S252: Yes), and the flow proceeds to step S260.

In step S253, the control circuit 143 determines whether or not the above described attempted communication sequentially performed by repeating the above described steps S251 and S252 was performed with all of the access points ACP for which the access point information P was acquired in the above described step S245'. In a case where the attempted communication has not been completed with all of the access points ACP, the decision is made that the condition is not satisfied (S253: No), the flow returns to step S251, and the same procedure is repeated. With this arrangement, in a case where information transmission and reception could not be performed with one of the access points ACP, an attempt is made to perform information transmission and reception with another of the access points ACP, with the same being performed with all of the access points ACP. In a case where attempted communication is completed with all of the access points ACP by such repetition, the decision is made that the condition is satisfied (S253: Yes), and the flow proceeds to step S254.

In step S254, in response to the unsuccessful attempted communication with each of the access points ACP despite the repetition of the above described steps S252-S253-S251- . . . , the control circuit 143 displays an error message on the display part (not shown) of the handheld printer 100 (error process). After the above described step S254 is completed, the flow is terminated.

On the other hand, in the above described step S246, in a case where only one set of the access point information P acquired in the above described step S245' exists, the decision is made that the condition of step S246 is not satisfied (S246: No), and the flow proceeds to step S247.

In step S247, the control circuit 143 attempts information transmission and reception with the above described one access point ACP by mutually recognized wireless communication, in the same manner as in the above described step S251. Subsequently, the flow proceeds to step S248.

In step S248, the control circuit 143 determines whether or not the attempted communication of information transmission and reception in step S247 succeeded, in the same manner as in the above described step S252. In a case where the attempted communication did not succeed, the decision is made that the condition is not satisfied (S248: No), and the flow proceeds to the above described step S254 where the above described error process is performed. On the other hand, in a case where the attempted communication succeeded, the decision is made that the condition is satisfied (S248: Yes) and the flow proceeds to step S260 in the same manner as in the above described FIG. 9 where the aforementioned acquisition process of print data is executed.

When step S260 is completed, the flow proceeds to the newly provided step S262. In step S262, the control circuit 143 transmits the communication completed report to the address of the above described operation terminal 200 via the access point ACP using the address information of the operation terminal 200 acquired in step S245', in the same manner as in the step S261 of the above described FIG. 12.

At that time, according to this modification, the access point ID of each of the access points ACP as well as the communication result of each of the access points ACP linked to the access point IDs (including information indicating that communication failed) are transmitted to the operation terminal 200. With this arrangement, the above described communication completed report and the communication result per access point ID are acquired by the operation terminal 200. The subsequent steps S265, S270, and S275 are the same as those of FIG. 9 and FIG. 12, and descriptions thereof will be omitted.

As indicated above, according to this modification, it is possible to attempt information transmission and reception with another access point ACP in a case where information transmission and reception could not be performed with one access point ACP, thereby improving the possibility of connection success of the handheld printer 100 with the access point ACP. Further, it is possible to transmit detailed information from the handheld printer 100 to the operation terminal 200, such as the access point ACP of the plurality of access points ACP with which the handheld printer 100 performed information transmission and reception, as well as the access points ACP with which information transmission and reception failed and the access point ACP with which information transmission and reception subsequently succeeded.

(3) Other

Note that, while the above has described an illustrative scenario of a case where the operation terminal 200 and the handheld printer 100 are connected with the access point ACP by WiFi (registered trademark) communication, the present disclosure is not limited thereto. That is, even in a case where the operation terminal 200 and the handheld printer 100 are connected with the access point ACP by suitable mutually recognized wireless communication, such as Bluetooth (registered trademark) communication or ad hoc communication of wireless LAN, the present disclosure can be applied in the same manner as described above and the same advantages are achieved.

Note that, while the above has described an illustrative scenario in which the present disclosure is applied to a case of the handheld printer 100 driven by a battery power source, the present disclosure is not limited thereto. That is, as another example of the printer, the present disclosure may be applied to a printer that forms an image or prints characters on a regular print-receiving medium of a size such as A4, A3, B4, or B5, for example, or to a printed label producing apparatus that performs desired printing on a print-receiving tape to produce a printed label, etc. In each of these cases as well, the same advantages are achieved.

Note that, in the above, the arrow shown in the FIG. 4 denotes an example of signal flow, but the signal flow direction is not limited thereto.

Also note that the present disclosure is not limited to the procedures illustrated in the flowcharts of FIG. 8, FIG. 9, FIG. 11, FIG. 12, and FIG. 14, and additions and deletions as well as sequence changes to the procedures may be made without deviating from the spirit and scope of the disclosure.

What is claimed is:

1. A printer configured to communicate with a handheld terminal and an access point, comprising:
    a feeder configured to feed a sheet;
    a printing head configured to perform printing on the sheet fed by the feeder;
    a RFID tag comprising a tag antenna configured to transmit and receive information through tag communication, and a memory configured to store information, the RFID tag being configured to receive an access point identifier (ID) for identifying an access point and a password for establishing a connection with the access point from the handheld terminal through the tag communication using the tag antenna;
    a communication antenna configured to transmit and receive information through wireless communication, the wireless communication being different from the tag communication; and
    a controller configured to execute:
    acquiring the access point ID and the password from the RFID tag via a wired connection;
    wirelessly connecting with the access point using the access point ID and the password acquired from the RFID tag;
    acquiring print data acquired through the wireless communication using the communication antenna, after wirelessly connecting with the access point; and
    controlling the feeder and the printing head to perform printing on the sheet according to the print data acquired.

2. The printer according to claim 1, wherein:
    address information of the handheld terminal is acquired in addition to the access point ID and the password, the address information being received by the RFID tag from the handheld terminal; and
    the controller is configured to further execute identifying the handheld terminal by the address information acquired, and transmitting a transmission and reception success report to the handheld terminal through the wireless communication via the communication antenna, after the wirelessly connecting with the access point.

3. The printer according to claim 2, wherein:
    the transmission and reception success report is transmitted to the handheld terminal, after the wirelessly connecting with the access point, the transmission and reception success report including the access point ID which is wirelessly connected.

4. The printer according to claim 1, wherein:
    a plurality of the access point IDs respectively identifying a plurality of the access points and a plurality of the passwords are acquired, the plurality of the access point IDs and the plurality of the passwords being received by the RFID tag from the handheld terminal, and
    the controller is configured to further execute attempting information transmission and reception sequentially with the plurality of access points using each of the plurality of the access point IDs and each of the plurality of the passwords acquired, wherein the print data is acquired when the information transmission and reception succeeds.

5. The printer according to claim 4, wherein:
    address information of the handheld terminal is further acquired in addition to the plurality of the access point IDs and the plurality of the passwords, the address information being received by the RFID tag from the handheld terminal, and
    the controller is configured to further execute identifying the handheld terminal by the address information acquired, and transmitting a communication result report per access point to the handheld terminal through wireless communication via the communication antenna, when information transmission and reception with the plurality of access points are performed, the communication result report including the access point ID of the access point.

6. The printer according to claim 1, wherein:
    the password is acquired by manual input in the handheld terminal.

\* \* \* \* \*